United States Patent
Sugimoto et al.

(10) Patent No.: US 8,064,031 B2
(45) Date of Patent: Nov. 22, 2011

(54) LIQUID CRYSTAL DISPLAY DEVICE

(75) Inventors: Katsuto Sugimoto, Mobara (JP); Hideo Suzuki, Mobara (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 337 days.

(21) Appl. No.: 12/354,033

(22) Filed: Jan. 15, 2009

(65) Prior Publication Data
US 2009/0185117 A1 Jul. 23, 2009

(30) Foreign Application Priority Data
Jan. 17, 2008 (JP) ................ 2008-007833

(51) Int. Cl.
*G02F 1/1339* (2006.01)
(52) U.S. Cl. ................. 349/153; 349/190
(58) Field of Classification Search ......... 349/189–190
See application file for complete search history.

(56) References Cited

U.S. PATENT DOCUMENTS

| | | | |
|---|---|---|---|
| 6,839,122 B2* | 1/2005 | Chung et al. | 349/153 |
| 6,956,636 B2* | 10/2005 | Yanagawa | 349/153 |
| 7,148,943 B2* | 12/2006 | Suzuki | 349/153 |
| 7,218,374 B2 | 5/2007 | Park et al. | |
| 7,679,708 B2* | 3/2010 | Momose et al. | 349/153 |

FOREIGN PATENT DOCUMENTS

| | | |
|---|---|---|
| JP | 2002-122870 | 4/2002 |
| JP | 2003-241204 | 8/2003 |

* cited by examiner

*Primary Examiner* — Eric Wong
(74) *Attorney, Agent, or Firm* — Antonelli, Terry, Stout & Kraus, LLP.

(57) ABSTRACT

An object of the present invention is to prevent irregular burrs from being created on the surface during cutting due to the cutting line crossing over the sealing material when a liquid crystal display panel is separated from a mother substrate. When the sealing material 30 is applied using a dispenser, the starting point 31 and the finishing point 32 of the sealing material are at points inside the cutting line 40, and thus, the cutting line 40 is prevented from crossing the sealing material 30 when the liquid crystal display panel is separated from a mother substrate 100. As a result, the breaking line 42 runs straight down from the scribe line 41, creating a clean cross section. Even though the starting point 31 and the finishing point 32 of the sealing material 30 are at points inside the liquid crystal display panel, the starting point 31 and the finishing point 32 are formed so as to be contained within the black matrix in frame form in the periphery, and thus, the display region is not affected.

14 Claims, 12 Drawing Sheets

LIQUID CRYSTAL DISPLAY DEVICE

The present application claims priority over Japanese Application JP 2008-7833 filed on Jan. 17, 2008, the contents of which are hereby incorporated into this application by reference.

BACKGROUND OF THE INVENTION (1) Field of the Invention

The present invention relates to a liquid crystal display device, and in particular, to the form of a sealing portion through which a TFT substrate and a facing substrate are pasted together in a liquid crystal display panel.

(2) Related Art Statement

In liquid crystal display devices, the space between the TFT substrate on which pixel electrodes and thin film transistors (TFT's) are formed in a matrix and the facing substrate on which color filters are formed is filled in with liquid crystal, so that molecules of the liquid crystal can be controlled through an electrical field, and thus, images can be formed. In general, a sealing material is applied around the periphery of the facing substrate using a sealing material applying apparatus, referred to as dispenser, and the TFT substrate and the facing substrate are pasted together.

In the case where the space between the substrates is filled in with liquid crystal in accordance with a suction method, the TFT substrate and the facing substrate are pasted together with a sealing material in between and the sealing material is cured, and after that, the inside space is vacuumed and filled with liquid crystal. Meanwhile, in the case where the space between the substrates is filled in with liquid crystal in accordance with a dropping method, liquid crystal is dropped on the TFT substrate before the TFT substrate and the facing substrate are pasted together, and then the facing substrate is pasted to the TFT substrate. After that, the sealing material is cured.

In the case where a sealing material is provided using a dispenser, the sealing material is applied in annular form around the periphery of the facing substrate in such a manner that the starting point of application using a dispenser overlaps with the finishing point, for example. "Patent Document 1" and "Patent Document 2" describe a technology for forming the finishing point or the starting point of application as described above at a distance from the display region toward the outside so that the overlapping portion does not affect the display region.

(Patent document 1) Japanese Unexamined Patent Publication 2003-241204
(Patent Document 2) Japanese Unexamined Patent Publication 2002-122870

SUMMARY OF THE INVENTION

Problem to Be Solved by the Invention

Figure 9A:
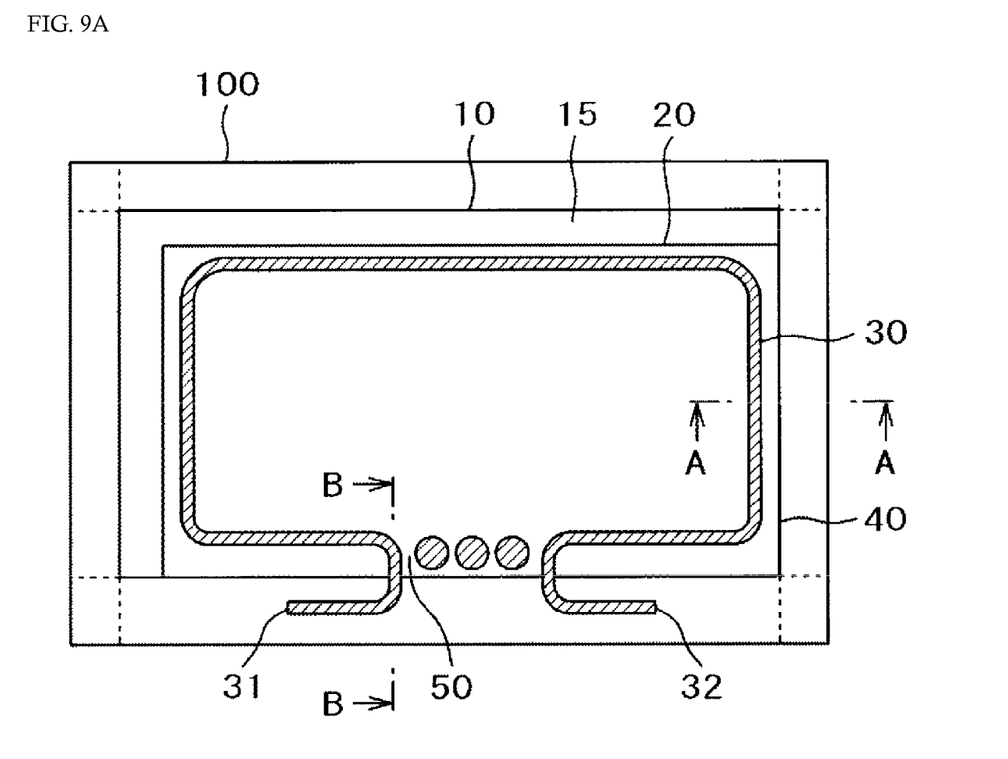
FIGS. 9(A) to 9(C) show a liquid crystal display panel formed in accordance with a suction method according to the prior art.
Figure 9B:
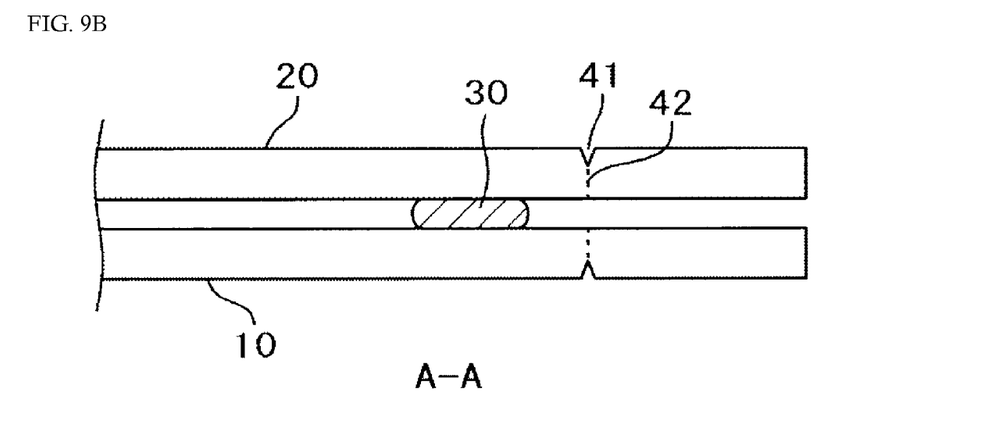
Figure 9C:
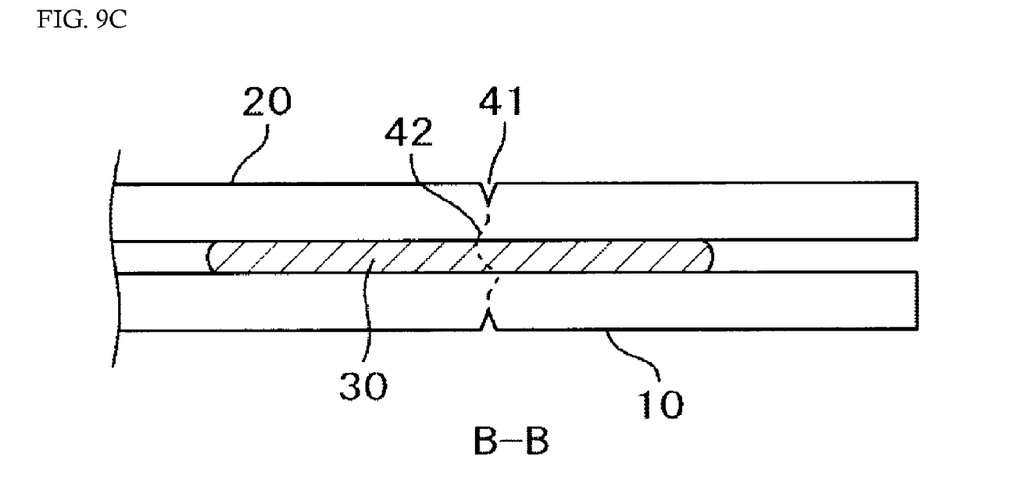

FIGS. 9(A) to 9(C) are schematic diagrams showing the form of the sealing material 30 according to the prior art in the case where the inside is filled with liquid crystal in accordance with a suction method. FIG. 9(A) is a plan diagram, FIG. 9(B) is a cross sectional diagram along A-A in FIG. 9(A), and FIG. 9(C) is a cross sectional diagram along B-B in FIG. 9(A). In FIG. 9(A), a TFT substrate 10 and a facing substrate 20 are pasted together via a sealing material 30. The space between the TFT substrate 10 and the facing substrate 20 is several μm. The TFT substrate 10 is larger than the facing substrate 20, and a terminal portion 15 is formed in the upper end portion and the left end portion in the TFT substrate 10 in FIG. 9(A).

In FIG. 9(A), the TFT substrate 10 and the facing substrate 20 are originally formed as a mother substrate 100 which is larger than the final liquid crystal display panel, and at the end separated from the mother substrate 100 along cutting lines 40. In the liquid crystal display panel shown in FIGS. 9(A) to 9(C), the inside is filled with liquid crystal in accordance with a suction method, and therefore, a suction hole 50 is created in the sealing material 30. In the suction hole 50, the sealing material is formed as dots using a dispenser, so that injection of liquid crystal can be easily controlled.

The starting point 31 and the finishing point 32 of application of a sealing material using a dispenser are at points in the vicinity of the suction hole 50 outside the cutting lines 40. Accordingly, the sealing material 30 is also cut in the vicinity of the suction hole 50 when the liquid crystal display panel is separated from the mother substrate 100 along the cutting lines 40. As shown in FIG. 9(B), when the liquid crystal display panel is separated from the mother substrate 100, scribe lines 41 are drawn along the cutting lines 40 on the TFT substrate 10 and the facing substrate 20, respectively. After that, an impact is applied to the TFT substrate 10 and the facing substrate 20, so that the TFT substrate 10 and the facing substrate 20 break along the breaking lines 42 indicated by the dotted lines in FIGS. 9(A) to 9(C), and thus, the liquid crystal display panel is separated. At this time, the broken surface is regular and has a smooth cross section.

However, the side of the separated liquid crystal display panel on which the suction hole 30 is created is not as clean as the other sides, because the sealing material 30 is also cut. This state is shown in FIG. 9(C), which is a cross sectional diagram along B-B in FIG. 9(A). That is to say, in FIG. 9(C), scribe lines 41 are drawn on the TFT substrate 10 and the facing substrate 20. In the case where an impact is applied to the facing substrate 20 in this state, for example, the broken line 42 does not run directly downward, due to the effects of the sealing material 30, and deviates from its course, as shown by the dotted line in FIG. 9(C). This is the same in the case where an impact is applied to the TFT substrate 10.

Accordingly, the surface in portions cut as shown in FIG. 9(C) is irregular, and there are glass burrs and burrs of the sealing material 30. Furthermore, glass fragments created at the time of cutting adhere to the sealing material 30, causing defects in subsequent steps.

Figure 10A:
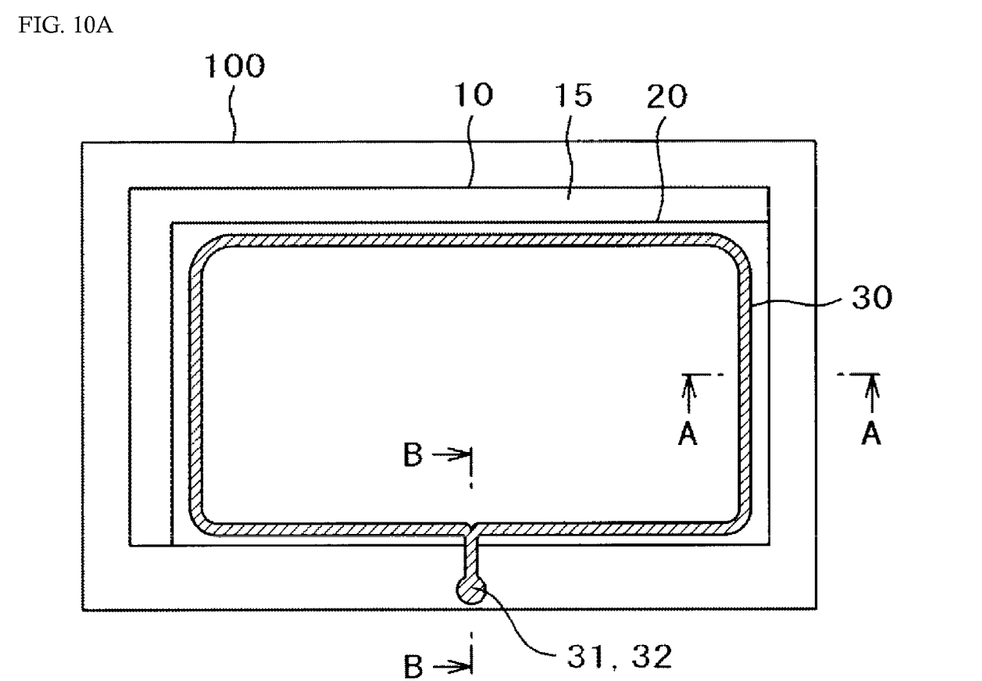
FIGS. 10(A) to 10(C) show a liquid crystal display panel formed in accordance with a dropping method according to the prior art.
Figure 10B:
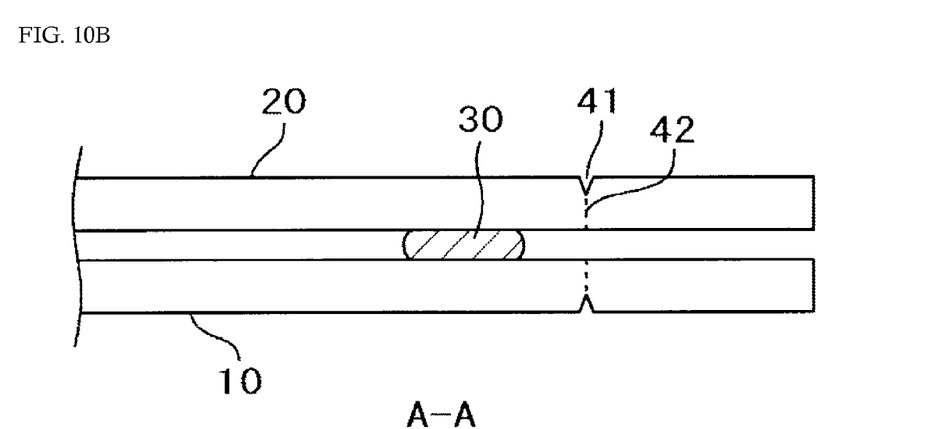
Figure 10C:
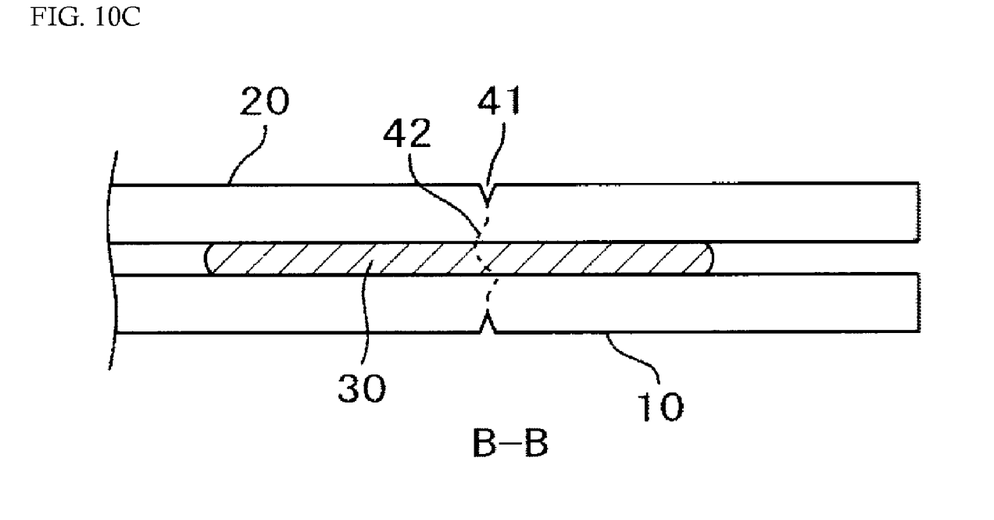

FIGS. 10(A) to 10(C) are schematic diagrams showing the form of the sealing material 30 according to the prior art in the case where the inside is filled with liquid crystal in accordance with a dropping method. FIG. 10(A) is a plan diagram, FIG. 10(B) is a cross sectional diagram along A-A in FIG. 10(A), and FIG. 10(C) is a cross sectional diagram along B-B in FIG. 10(A). In FIG. 10(A), the TFT substrate 10 and the facing substrate 20 are pasted together via the sealing material 30. The space between the TFT substrate 10 and the facing substrate 20 is several μm. The TFT substrate 10 is larger than the facing substrate 20, and a terminal portion 15 is formed in the upper end portion and the left end portion of the TFT substrate 10 in FIG. 10(A).

In FIGS. 10(A) to 10(C), the inside is filled with liquid crystal in accordance with a dropping method, and therefore, no suction hole is created in the sealing material 30. In this case also, however, the sealing material 30 is formed using a dispenser, and the starting point 31 and the finishing point 32 of the sealing material 30 overlap. The overlapping portion is wider than other portions because it spread out when the TFT substrate and the facing substrate are pasted together. In order to prevent the overlapping portion of the sealing material 30 from negatively affecting the display region 110, the overlapping portion of the starting point 31 and the finishing point 32 of the sealing material 30 is at a point outside the TFT substrate 10.

Thus, the same problem arises as in the case of FIGS. 9(A) to 9(C) when the liquid crystal display panel is separated from the mother substrate 100. That is to say, as shown in FIG. 10(B), a clean surface is created when the substrates are broken in the case where the cutting line 40 does not cross the sealing material 30. As shown in FIG. 10(C), however, in the case where the cutting line 40 crosses the sealing material 30, irregular burrs are created on the surface when the substrates are cut, and glass fragments adhere to the broken substrate of the sealing material 30, causing defects in subsequent steps, as described above in reference to FIGS. 9(A) to 9(C).

The starting point 31 and the finishing point 32 of application of a sealing material 30 are at points in an end portion of the mother substrate 100 shown in FIGS. 9(A) to 10(C). Accordingly, the end portion cannot be used effectively, and thus, the yield of the material lowers. In addition, FIGS. 9(A) to 10(C) show a case where one liquid crystal display panel is taken out from a mother substrate 100. Not as many liquid crystal display panels can be taken out from a mother substrate 100 in the case where a number of liquid crystal display panels are formed in a mother substrate 100.

The present invention provides measures against the above described problems.

Means for Solving Problem

The present invention is provided in order to solve the above described problems with the prior art, and the starting point and the finishing point of application of a sealing material using a dispenser are at points inside the liquid crystal display panel, and at the same time, the frame in around periphery of the black matrix becomes thicker along the side where the starting point and the finishing point of application of a sealing material are, in order to prevent the starting point and the finishing point of application of a sealing material from affecting the display region.

Concretely, a liquid crystal display device is provided so as to have a liquid crystal display panel having a TFT substrate, a facing substrate and a sealing member for pasting the above described facing substrate and the above described TFT substrate together, and is filled in with liquid crystal between the above described facing substrate and the above described TFT substrate, and is characterized in that the above described sealing member is formed in annular form along the end portion of the above described liquid crystal display panel and has end portions which are a starting point and a finishing point when the sealing member is formed, and the end portion of the sealing member are at points within the above described liquid crystal display panel.

Furthermore, a liquid crystal display device is provided so as to have a liquid crystal display panel having a TFT substrate, a facing substrate and a sealing member for pasting the above described facing substrate and the above described TFT substrate together, and is filled in with liquid crystal between the above described facing substrate and the above described TFT substrate, and is characterized in that a black matrix in frame form is formed in the periphery of the display region of the above described facing substrate, the above described sealing member is formed in annular form in the periphery of the above described black matrix and has a suction hole for sucking in liquid crystal, and the above described sealing member has end portions which are a starting point and a finishing point when the above described sealing member is formed, and the end portions of the above described sealing member are formed within the above described liquid crystal display panel outside the border between the above described black matrix and the above described display region.

Moreover, a liquid crystal display device is provided so as to have a liquid crystal display panel having a TFT substrate, a facing substrate and a sealing member for pasting the above described facing substrate and the above described TFT substrate together, and is filled in with liquid crystal between the above described facing substrate and the above described TFT substrate, and is characterized in that a black matrix in frame form is formed in the periphery of the display region of the above described facing substrate, the above described sealing member has end portions which are a starting point and a finishing point when the above described sealing member is formed in the above described suction hole in such a manner that the end portions of the above described sealing member overlap, and the end portions of the above described sealing member are at points within the liquid crystal display panel outside the border between the above described black matrix and the above described display region.

Effects of the Invention

According to the present invention, the starting point and the finishing point of application are at points inside the liquid crystal display panel when the sealing material is formed through application using a dispenser, and therefore, the cutting line does not cross over the sealing material when the liquid crystal display panel is separated from the mother substrate. Accordingly, the end portions of the liquid crystal display panel have a regular, smooth surface around the entire periphery. In addition, no glass fragments adhere to the sealing material made of a resin, and therefore, the yield in the process can be prevented from lowering due to glass fragments.

According to the present invention, a maximal number of liquid crystal display panels can be taken out from a mother substrate in the case where a number of liquid crystal display panels are formed in a mother substrate, and therefore, the yield of the material can be increased. In addition, the number of liquid crystal display panels formed per mother substrate can in some cases be increased. Furthermore, the amount of work for separating a liquid crystal display panel from a mother substrate, for example the amount of work for scribing, can be reduced, and therefore, the cost of the process can be reduced and glass fragments and the like prevented from being created.

EXPLANATION OF SYMBOLS

10 . . . TFT substrate
15 . . . terminal portion
20 . . . facing substrate
30 . . . sealing material
31 . . . starting point of application of sealing material
32 . . . finishing point of application of sealing material
40 . . . cutting line
41 . . . scribe line
42 . . . breaking line
50 . . . suction hole
60 . . . window in black matrix
100 . . . mother substrate
110 . . . display region
BM . . . black matrix

DETAILED DESCRIPTION OF THE INVENTION

Best Mode for Carrying Out the Invention

The details of the present invention are disclosed in reference to the drawings.

First Embodiment

Figure 1A:
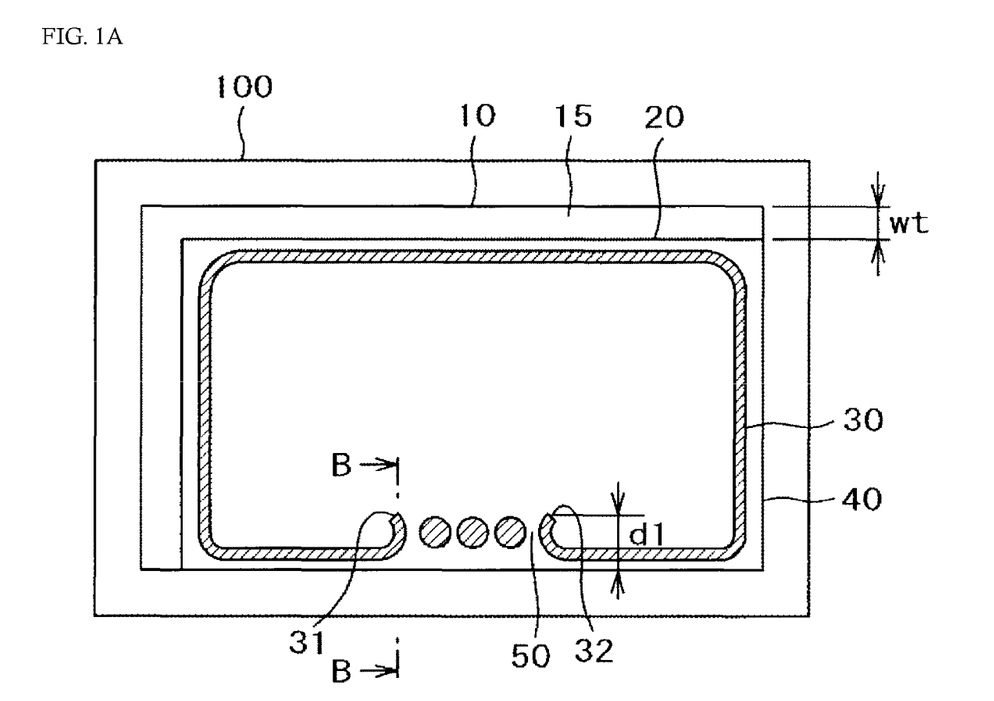
FIGS. 1(A) and 1(B) show a liquid crystal display panel according to the first embodiment.
Figure 1B:
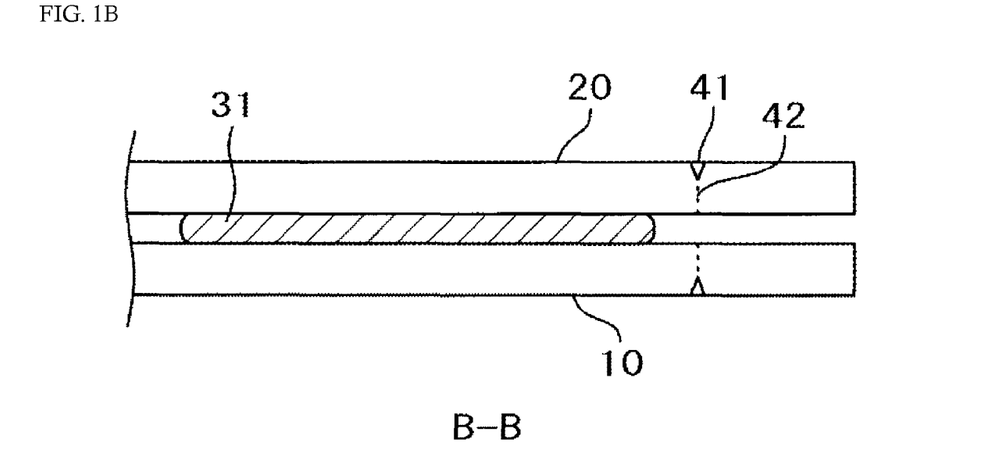

FIGS. 1(A) and 1(B) are diagrams showing the first embodiment of the present invention. FIG. 1(A) is a plan diagram, and FIG. 1(B) is a cross sectional diagram along B-B in FIG. 1(A). FIGS. 1(A) and 1(B) are schematic diagrams showing the features of the present embodiment, and show only a TFT substrate 10, a facing substrate 20, a mother substrate 100 and a sealing material 30, and the rest is omitted. In the present specification, the mother substrate is a combination of large substrates where a TFT substrate and a facing substrate are formed. Alternatively, the mother substrate may sometimes be a substrate where a number of TFT substrates or a number of facing substrates are formed, or only one TFT substrate or facing substrate is taken out from a mother substrate, and the mother substrate is larger by the margin which is removed.

FIGS. 1(A) and 1(B) show a case where the present invention is applied to a liquid crystal display panel where the inside is filled with liquid crystal in accordance with a suction method. FIGS. 1(A) and 1(B) show a case where the margin is cut off from the mother substrate 100 in order to take out one liquid crystal display panel.

In FIG. 1(A), a TFT substrate 10 and a facing substrate 20 are pasted together via a sealing material 30. An ultraviolet ray curing resin (UV curing resin) is used for the sealing material. The space between the TFT substrate 10 and the facing substrate 20 is several μm. The TFT substrate 10 is larger than the facing substrate 20, and a terminal portion 15 is formed in the upper end portion and the left end portion in the TFT substrate 10 in FIG. 9(A). The width wt of the terminal portion 15 is 2.5 mm for example.

In the liquid crystal display panel shown in FIGS. 1(A) and 1(B), the inside is filled with liquid crystal in accordance with a suction method, and therefore, a suction hole 50 is created in the sealing material 30. The sealing material is formed in dots in the suction hole 50 portion using a dispenser, in order to make it easy to control the injection of liquid crystal, as in the prior art. the first embodiment is greatly different from the prior art in that the starting point 31 and the finishing point 32 of the sealing material 30 which create the suction hole 50 for liquid crystal are at points on the display region side of the sealing material 30 formed in annular form.

In the case where the starting point 31 and the finishing point 32 of the sealing material 30 are provided as shown in FIG. 1(A), the cutting line 40 does not cross over the sealing material 30 when the liquid crystal display panel is cut out from the mother substrate 100. Accordingly, when an impact is applied in order to separate the liquid crystal display panel from the mother substrate 100 after drawing a scribe line 41, the breaking line 42 runs down from the scribe line 41 as shown by the dotted line in FIG. 1(B), and thus, a regular cross section can be gained, as on the other sides.

Accordingly, irregular burrs can be prevented from being created on the surface when the substrates are broken, and thus, the liquid crystal display panel becomes safer to handle. In addition, the sealing material 30 is not cut, and therefore, defects due to glass fragments adhering to the sealing material 30 can be prevented in subsequent steps.

Concerning the first embodiment, it should be noted that there is a possibility that the display region 110 may be affected, depending on where the starting point 31 and the finishing point 32 of the sealing material 30 are. That is to say, it becomes an issue what the distance d1 between the end portion of the TFT substrate 10 or facing substrate 20 and the starting point 31 or finishing point 32 should be in FIG. 1(A).

Figure 2:
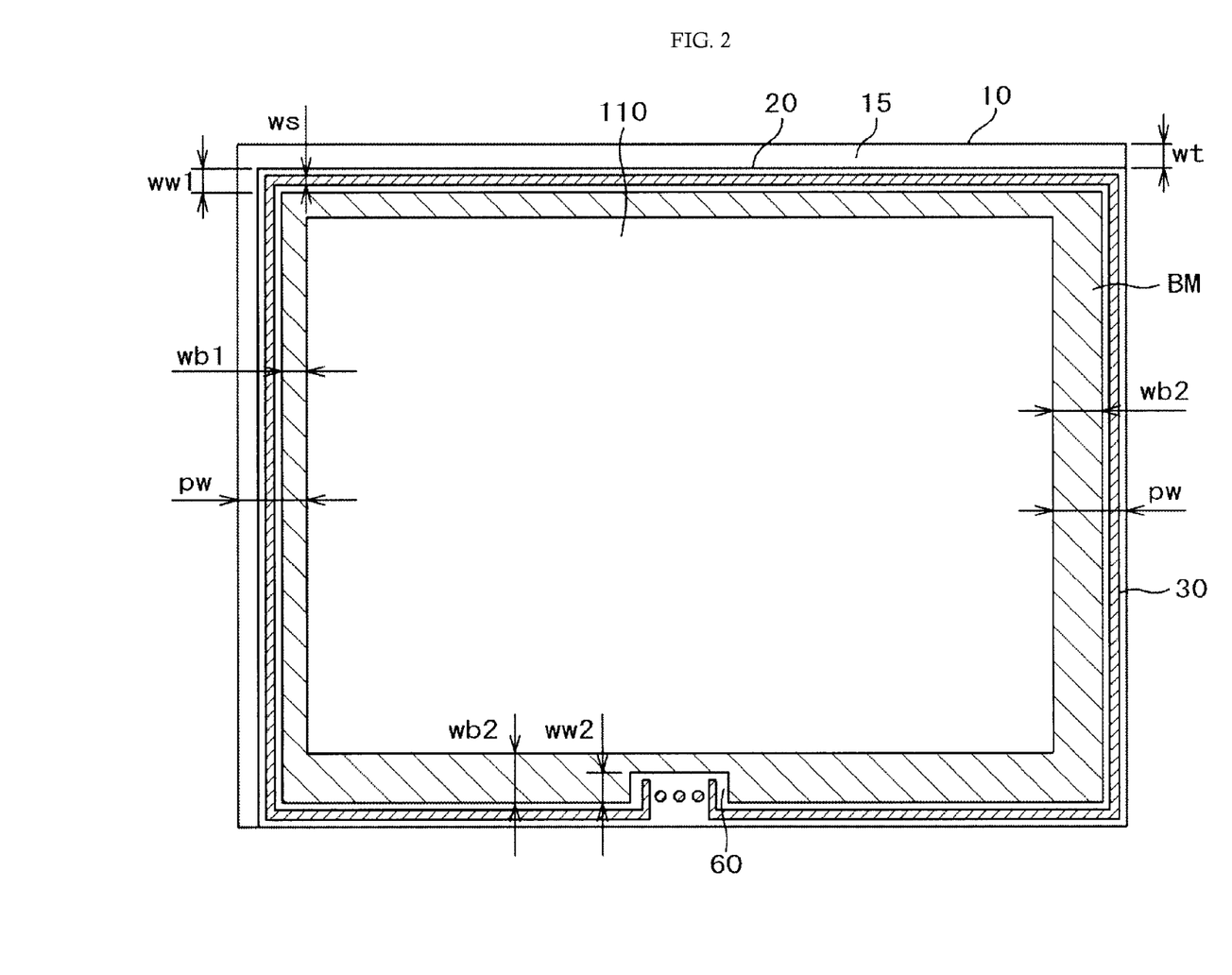
FIG. 2 is a plan diagram showing the liquid crystal display panel according to the first embodiment.

FIG. 2 is a plan diagram showing a liquid crystal display panel after separation from the mother substrate 100. In FIG. 2, the TFT substrate 10 and the facing substrate 20 overlap and face each other via the sealing material 30. In FIG. 2, the upper and left side of the TFT substrate 10 is larger than the facing substrate 20 by a width wt. In this portion, a terminal portion 15 for supplying power and signals to the liquid crystal display panel from the outside is formed.

In FIG. 2, red pixels, green pixels, blue pixels and the like, not shown, are formed in a matrix in the display region 110, and a black matrix BM is formed between the respective pigments in order to increase the contrast. The display region 110 is formed at the center of the TFT substrate 10. That is to say, the distance pw between the end portion of the TFT substrate 10 and the border between the black matrix BM in frame form and the display region 110 is the same around the entire periphery. The black matrix BM in frame form is formed around the display region 110, and the width wb1 thereof along the sides along which the terminal portion 15 is formed on the TFT substrate 10 is smaller than the width wb2 along the sides along which the terminal portion 15 is not formed.

Meanwhile, the sealing material 30 is formed in a portion of the periphery of the facing substrate 20 facing the TFT substrate 10. The sealing material 30 is applied to the facing substrate 20 using a dispenser, and after that pressed and spreads out when the TFT substrate 10 and the facing substrate 20 are pasted together, and the width ws of the spread sealing material is approximately 2 mm. The TFT substrate 10 and the facing substrate 20 are pasted together using the sealing material 30, and then the sealing material 30 is cured through irradiation with ultraviolet rays (irradiation with UV rays). When the sealing material 30 is covered with the black matrix BM, however, the covered portion cannot be irradiated with UV rays, and therefore, the black matrix BM is removed from the portion where there is a sealing material 30. The width ww of the portion from which the black matrix BM is thus removed is approximately 2.5 mm.

In FIG. 2, the distance pw between the end portion of the TFT substrate 10 and the end portion of the display region 110 is the same along the side where the terminal portion 5 is formed and the side where the terminal portion 15 is formed, and approximately 10.5 mm, for example. Accordingly, the width wb1 of the black matrix BM along the sides where the terminal portion 15 is formed is 5.5 mm, for example, and the width wb2 of the black matrix BM on the sides where the terminal portion 15 is not formed is 8 mm, for example.

In the present embodiment, the sealing material is applied using a dispenser, and the starting point 31 and the finishing point 32 of application of a sealing material are provided on the display region 110 side. The starting point 31 and the finishing point 32 are formed within the black matrix BM in frame form, and thus, problems with the sealing material sticking out into the display region 110 can be avoided. In the present embodiment, the starting point 31 and the finishing point 32 of application of a sealing material are provided along a side along which the terminal portion 15 is not formed, and the width wb2 of the black matrix in frame form in this portion is 8 mm. Accordingly, it is necessary for the starting point 31 and the finishing point 32 of the sealing material to be contained within a space of 8 mm or less.

Meanwhile, it is necessary to cure the sealing material 30 through irradiation with UV rays at the starting point 31 and the finishing point 32 of application of a sealing material. Accordingly, it is necessary to remove the black matrix BM at the starting point 31 and the finishing point 32 of application of a sealing material as well. In this case, the black matrix BM is removed so that a window is created, and the depth ww2 of the window 60 in FIG. 2 is 5 mm in the present embodiment. Accordingly, the width of the black matrix BM in the portion where the window 60 is created is 3 mm. Thus, a window 60 is created in a portion of the black matrix BM where the starting point 31 and the finishing point 32 of application of a sealing material are provided, and thus, all of the sealing material 30 can be cured, and the reliability of the sealing material 30 improves.

As described above, in the present embodiment, the sealing material 30 does not cross over the cutting line 40 when the liquid crystal display panel is separated from the mother substrate 100, and therefore, irregular burrs can be prevented from being created throughout the entirety of the periphery of the liquid crystal display panel. Furthermore, the yield in the process can be prevented from lowering due to problems caused by glass fragments adhering to the sealing material 30.

Figure 3:
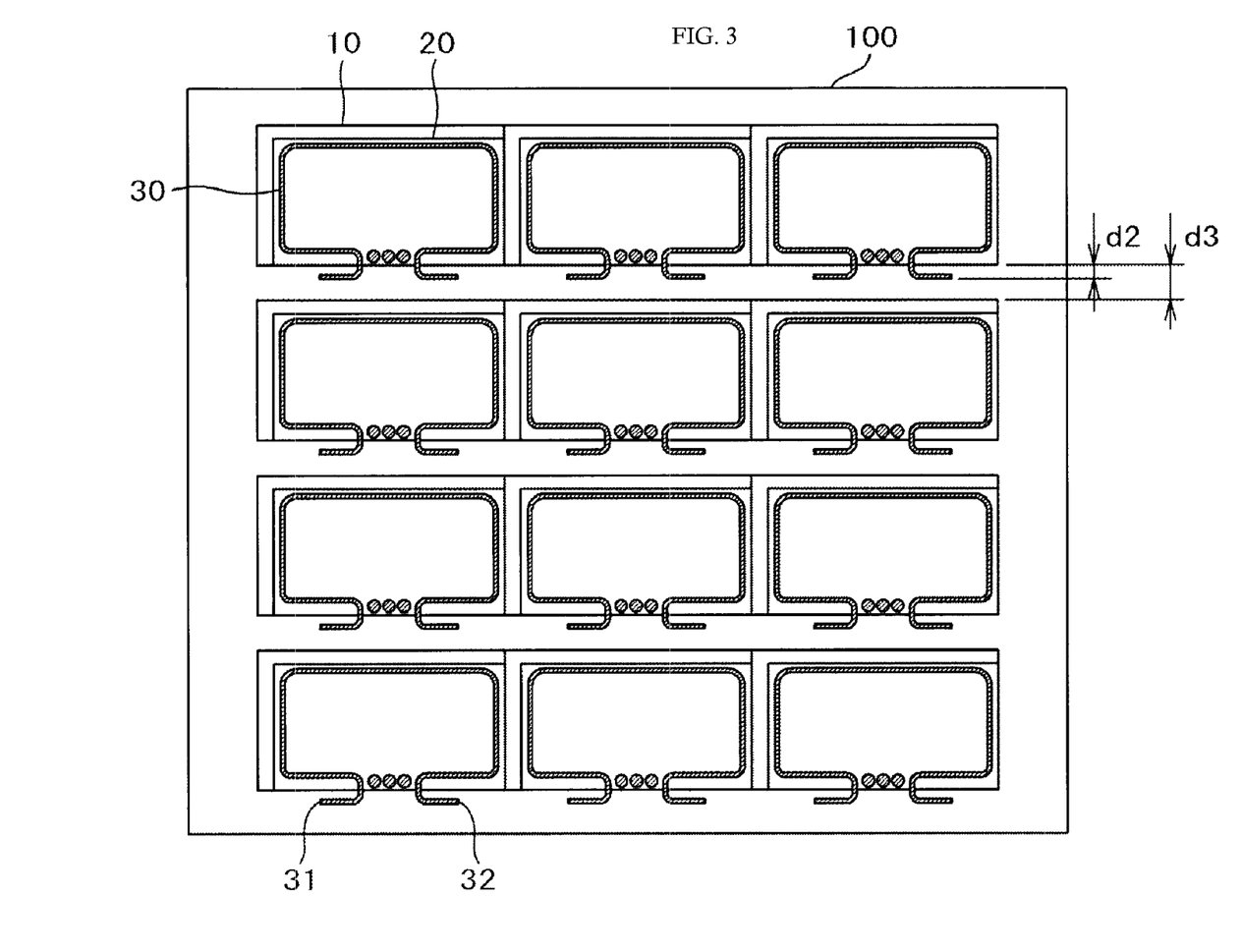
FIG. 3 shows the arrangement of a liquid crystal display panel formed in accordance with a suction method according to the prior art on a mother substrate.

Though in the above, a case is described where one liquid crystal display panel is formed from a mother substrate 100, in many actual cases a number of liquid crystal display panels are formed in a mother substrate 100. FIG. 3 shows an example of the arrangement of liquid crystal display panels in a mother substrate 100 in accordance with a method for forming a sealing material 30 according to the prior art. In FIG. 3, twelve liquid crystal display panels are taken out from a mother substrate 100. According to the prior art, the starting point 31 and the finishing point 32 of application of a sealing material are provided outside the cutting line 40 on the liquid crystal display panel. Accordingly, liquid crystal display panels cannot be aligned on a mother substrate 100 without spaces in between, and thus, the yield of the material lowers by the depth d3, as shown in FIG. 3. It is necessary for every column to have d3, and therefore, in some cases the number of liquid crystal display panels taken out from the mother substrate 100 may be small.

In FIG. 3, the starting point 31 and the finishing point 32 of application of a sealing material are formed within an area having a width d2 outside the cutting lines 40 of the liquid crystal display panel. In FIG. 3, the distance d3 between liquid crystal display panels in the longitudinal direction can be reduced to close to d2, but not to d2 or less. Accordingly, the yield of the material cannot be increased above certain level according to the prior art. In addition, in the case where liquid crystal display panels are separated in the longitudinal direction, the work of cutting by drawing scribe lines and applying an impact must be carried out twice, and thus, the margin must be removed from between liquid display panels.

Figure 4:
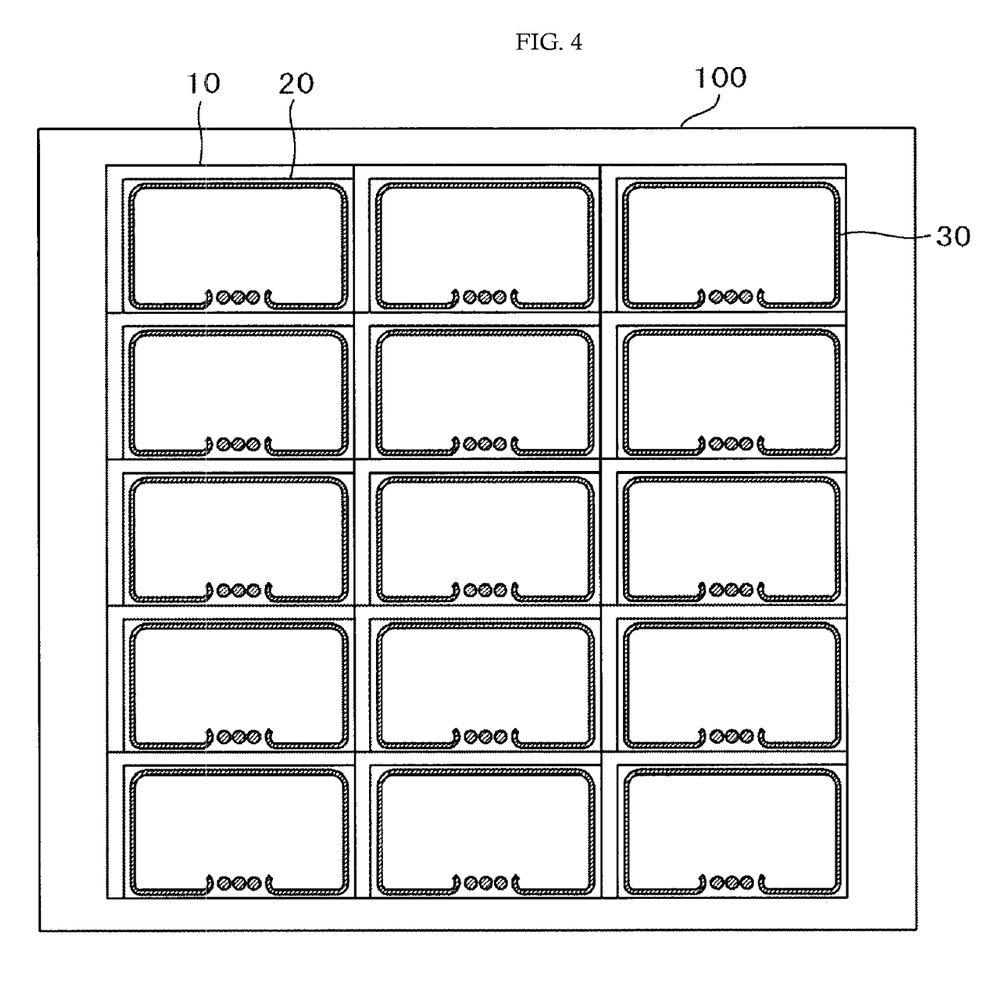
FIG. 4 shows the arrangement of the liquid crystal display panel according to the first embodiment on a mother substrate.

FIG. 4 is a plan diagram showing a case where liquid crystal display panels to which the present invention is applied are aligned in a mother substrate 100. In FIG. 4, fifteen liquid crystal display panels are formed in a single mother substrate 100. In liquid crystal display panels to which the present invention can be applied, the starting point 31 and the finishing point 32 of application of a sealing material are formed within the liquid crystal display panels. Accordingly, the liquid crystal display panels can be aligned without spaces in the longitudinal direction in the mother substrate 100. That is to say, no material is wasted in the mother substrate 100, and the yield of the material can be made 100%. Accordingly, in some cases the number of liquid crystal display panels formed in a mother substrate 100 is greater than in the prior art.

Furthermore, according to the present invention, the work of separating liquid crystal display panels from the mother substrate 100 in the longitudinal direction can be carried out in a single process for division. That is to say, there is no margin to be removed between liquid crystal display panels. Furthermore, the work of separation is carried out just once, meaning that the amount of glass fragments becomes half, and reduction in the yield in the process due to glass fragments can be prevented. In addition, according to the present embodiment, the cutting line 40 does not cross over the sealing material 30 when liquid crystal display panels are separated, and therefore, no irregular cross section or burrs are created in end portions of the liquid crystal display panels. In addition, the yield in the process is not reduced due to glass fragments adhering in portions crossing over the sealing material 30.

Second Embodiment

Figure 5A:
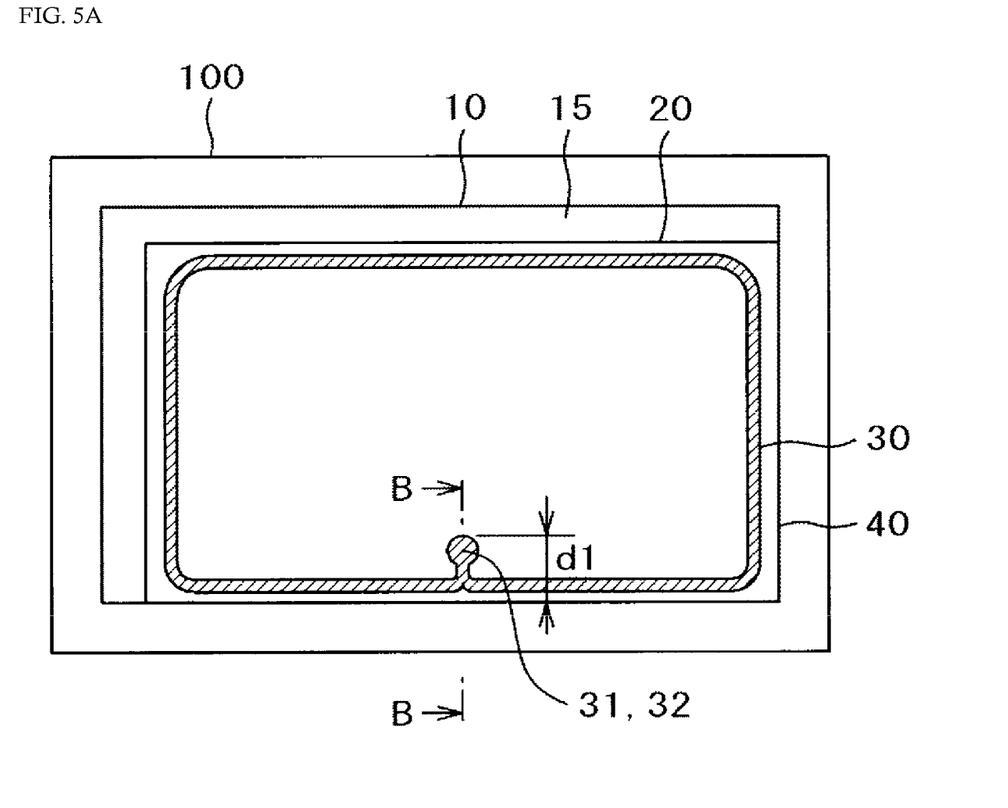
FIGS. 5(A) and 5(B) show a liquid crystal display panel according to the second embodiment.
Figure 5B:
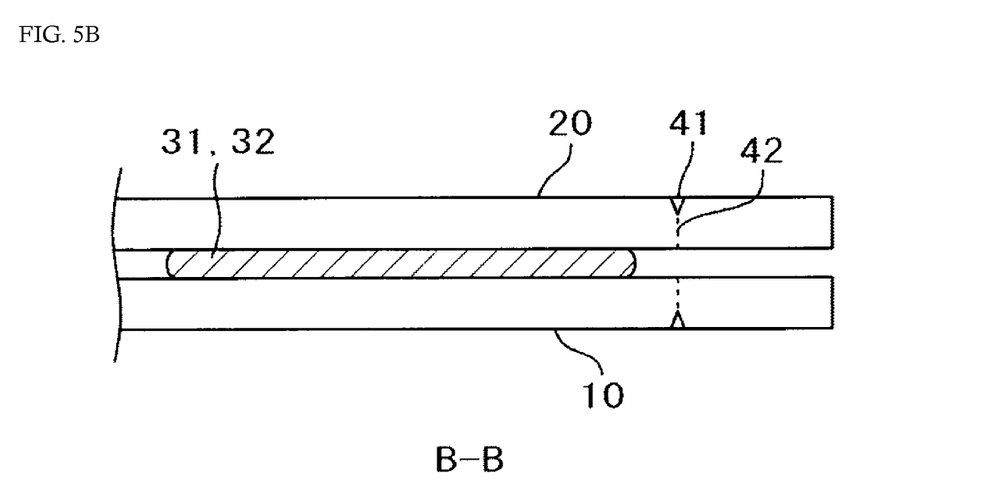

FIGS. 5(A) and 5(B) are diagrams showing the second embodiment. FIG. 5(A) is a plan diagram and FIG. 5(B) is a cross sectional diagram along B-B in FIG. 5(A). FIGS. 5(A) and 5(B) are schematic diagrams showing the features of the present embodiment, and show only a TFT substrate 10, a facing substrate 20, a mother substrate 100 and a sealing material 30, and the rest is omitted.

FIGS. 5(A) and 5(B) show a case where the present invention is applied to a liquid crystal display panel which is filled with liquid crystal in accordance with a dropping method. FIGS. 5(A) and 5(B) show a case where one liquid crystal display panel is formed from a mother substrate 100.

In FIG. 5(A), the liquid crystal display panel has the same configuration as in FIGS. 1(A) and 1(B), except in the form of the sealing material 30. In FIG. 5(A), no suction hole 50 for liquid crystal is created. In FIG. 5(A), the starting point 31 and the finishing point 32 of application of a sealing material are provided along the lower side of the liquid crystal display panel. The starting point 31 and the finishing point 32 of application for a sealing material overlap. Accordingly, in this portion, the width of the sealing material is greater than in other parts. In the present embodiment also, the sealing material 30 is applied using a dispenser in such a manner that the starting point 31 and the finishing point 32 of application of a sealing material are both formed between the liquid crystal display panel. Actually the starting point 31 and the finishing point 32 of application of a sealing material are provided at a point closer to the display region 110 than the sealing material 30 formed in annular form.

In this case, the distance d1 between the end portion of the starting point 31 or finishing point 32 of application of a sealing material and the end portion of the liquid crystal display panel must be in such a range as not to affect the display region 110.

FIG. 5(B) is a cross sectional diagram along B-B in FIG. 5(A). FIG. 5(B) shows how a liquid crystal display panel is separated from a mother substrate 100 along a cutting line 40 in the vicinity of the starting point 31 and the finishing point 32 of application of a sealing material. In the present embodiment also, the sealing material 30 does not cross over the cutting line 40, and therefore, as shown in FIG. 5(B), the TFT substrate 10 and the facing substrate 20 are cleanly cut and broken, as shown by the dotted line in FIG. 5(B), when an impact is applied along the scribe line 41 created on the TFT substrate 10 and the facing substrate 20. Accordingly, in the present embodiment also, the end portion in the periphery of the liquid crystal display panel can be in regular form as a whole.

Figure 6:
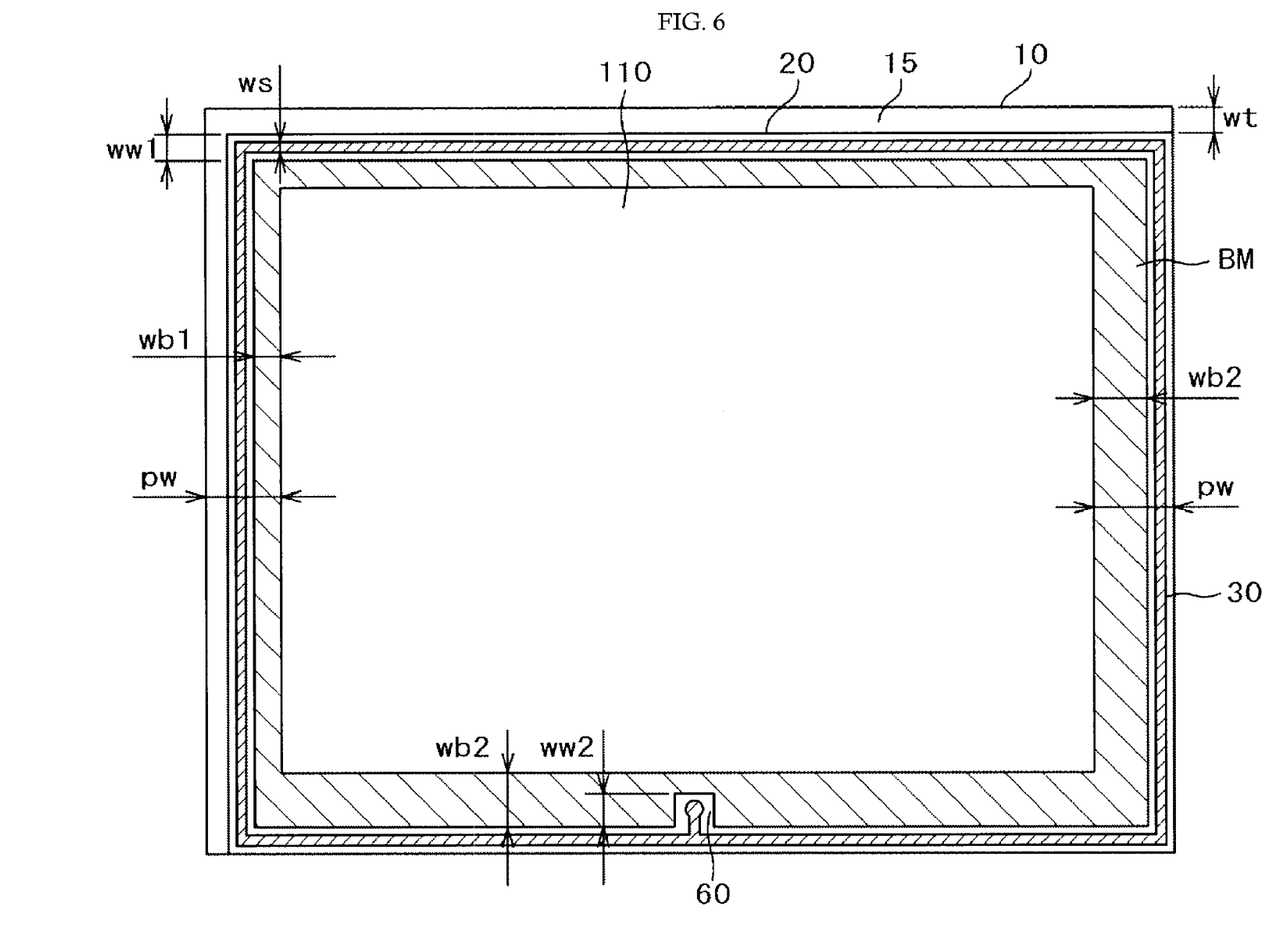
FIG. 6 is a plan diagram showing the liquid crystal display panel according to the second embodiment.

FIG. 6 is a plan diagram showing a liquid crystal display panel after separation from the mother substrate 100. The liquid crystal display panel shown in FIG. 6 is the same as that according to the first embodiment in FIG. 2, except in the form of the sealing material 30. No suction hole for liquid crystal is created in the sealing material 30 in FIG. 6. The form of the sealing material 30 is also the same as in the first embodiment, except in the starting point 31 and the finishing point 32 of application of a sealing material. That is to say, a sealing material 30 is formed in portions in the periphery of the facing substrate 20 facing the TFT substrate 10. The sealing material 30 is applied on the facing substrate 20 using a dispenser, and after that pressed and spreads out when the TFT substrate 10 and the facing substrate 20 are pasted together, so that the width ws of the spread sealing material is approximately 2 mm. In addition, the TFT substrate 10 and the facing substrate 20 are pasted together via a sealing material 30, and after that, the sealing material 30 is cured through irradiation with ultraviolet rays (irradiation with UV rays). When the sealing material 30 is covered with a black matrix BM, however, the sealing material cannot be irradiated with UV rays, and therefore, the black matrix BM is removed from portions where there is the sealing material 30. The width ww1 of the portion from which BM is thus removed is approximately 2.5 mm.

In the present embodiment also, the sealing material is applied using a dispenser, and unlike in the case of the first embodiment, the starting point 31 and the finishing point 32 of application of a sealing material overlap. Accordingly, the width of the sealing material 30 is greater in the overlapping portion than in other portions. Meanwhile, the starting point 31 and the finishing point 32 of application of a sealing material are provided on the display region 110 side of the sealing material 30 formed in annular form, as in the first embodiment. Thus, the overlapping portion of the starting point 31 and the finishing point 32 is at a point outside the inner end of the black matrix BM in frame form, so that problems with the sealing material sticking out into the display region 110 can be avoided. In the present embodiment, the starting point 31 and the finishing point 32 of application of a sealing material are provided along a side along which the terminal portion 15 is not formed, and the width wb2 of the black matrix BM in frame form in this portion is 8 mm. Accordingly, the starting point 31 and the finishing point 32 of the sealing material, as well as the overlapping portion, should be contained in an area having a width of 8 mm, which is the value of wb2, or less.

Meanwhile, it is necessary to cure the sealing material 30 through irradiation with UV rays at the starting point 31 and the finishing point 32 of application of a sealing material. Accordingly, it is necessary to remove the black matrix BM in the starting point 31 and the finishing point 32 of application of a sealing material as well. In this case, the black matrix BM is removed so that a window is created, and the depth ww2 of the window 60 in the figure is 5 mm in the present embodiment. As described above, a window 60 is created in the black matrix BM, where the starting point 31 and the finishing point 32 of application of a sealing material are, and thus, all of the sealing material 30 can be cured, and the reliability of the sealing material 30 can be increased.

As described above, in liquid crystal display panels formed in accordance with a dropping method according to the present embodiment also, the cutting line 40 does not cross over the sealing material 30 when the liquid crystal display panel is separated from the mother substrate 100, and therefore, irregular burrs can be prevented from being created around the entire periphery of the liquid crystal display panel. Furthermore, the yield can be prevented from lowering due to problems with glass fragments adhering to the sealing material 30.

Figure 7:
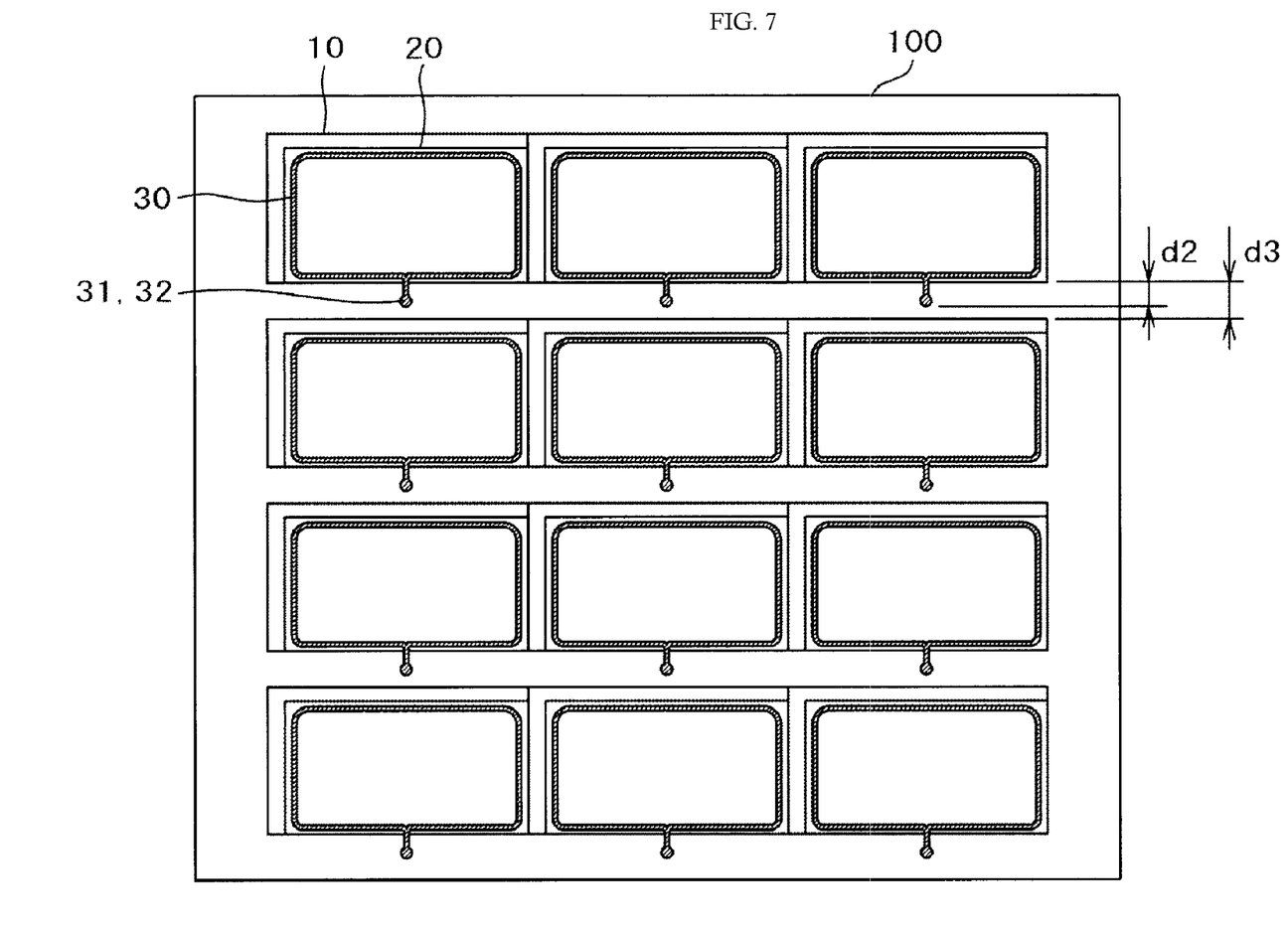
FIG. 7 shows the arrangement of a liquid crystal display panel formed in accordance with a dropping method according to the prior art on a mother substrate.

Though in the above description, one liquid crystal display panel is formed from a mother substrate 100, in many actual cases, a number of liquid crystal display panels are formed in a mother substrate 100. FIG. 7 shows an example of the arrangement of liquid crystal display panels in a mother substrate 100 formed in accordance with a liquid crystal dropping method for forming a sealing material 30 according to the prior art. In FIG. 7, twelve liquid crystal display panels are taken out from a mother substrate 100. The overlapping portion of the starting point 31 and the finishing point 32 of application of a sealing material is at a point outside the cutting line 40 of the liquid crystal display panel according to the prior art. Accordingly, liquid crystal display panels cannot be aligned in a mother substrate 100 without a space in between, and thus, the yield of the material lowers by the width d3, as shown in FIG. 7. It is necessary for every column to have d3, and therefore, in some cases the number of liquid crystal display panels that can be taken out from a mother substrate 100 may be smaller.

In FIG. 7, the overlapping portion of the starting point 31 and the finishing point 32 of application of a sealing material is formed within an area having a width d2 outside the cutting lines 40 on the liquid crystal display panel. In FIG. 7, the space d3 between liquid crystal display panels when arranged in the longitudinal direction can be reduced to close to d2, but not to d2 or less. Accordingly, the yield of the material cannot be raised more than to a certain level according to the prior art. In addition, in the case where liquid crystal display panels are separated in the longitudinal direction, the work of separation by drawing a scribe lie and applying an impulse must be carried out twice. A margin to be removed must be created between liquid crystal display panels.

Figure 8:
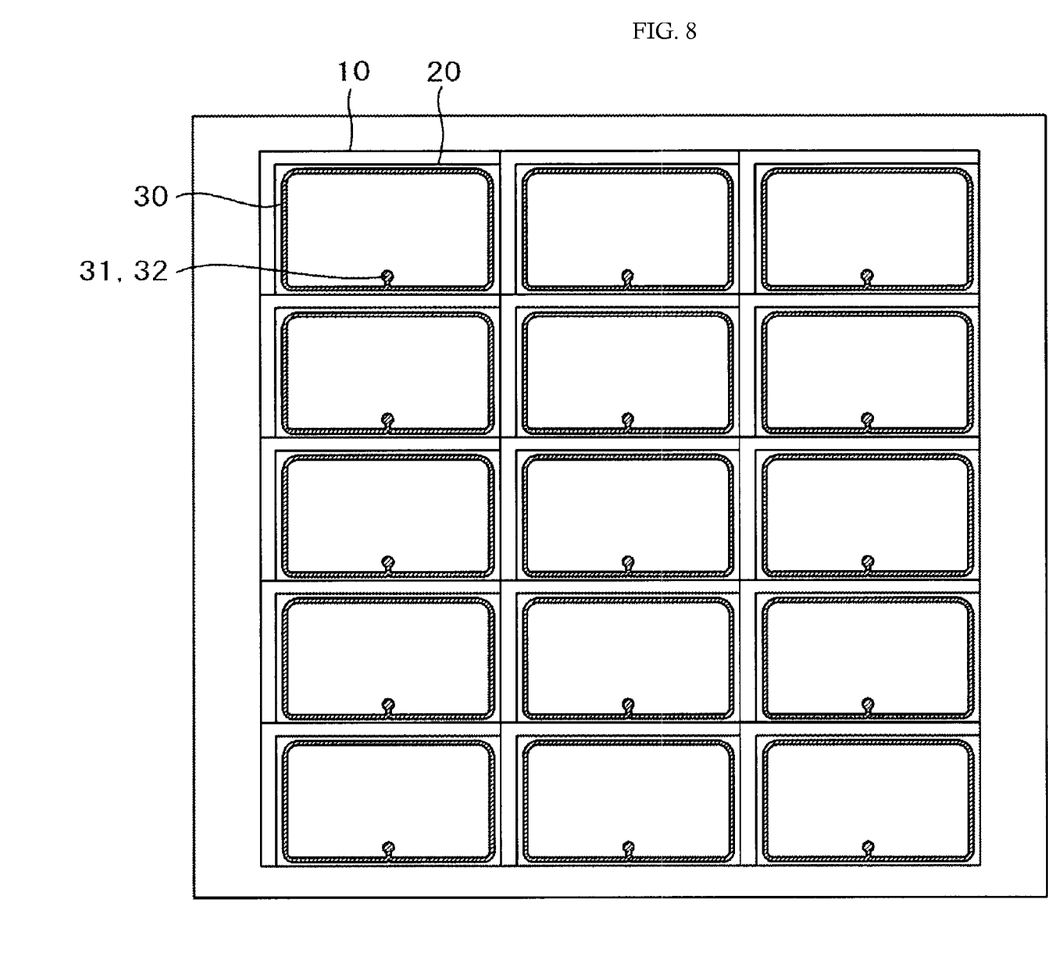
FIG. 8 shows the arrangement of the liquid crystal display panel according to the first embodiment on a mother substrate.

FIG. 8 is a plan diagram showing a case where liquid crystal display panels to which the present invention is applied are aligned in a mother substrate 100. In FIG. 8, fifteen liquid crystal display panels are formed in a single mother substrate 100. In liquid crystal display panels to which the present invention can be applied, the overlapping portion of the starting point 31 and the finishing point 32 of application of a sealing material is at a point within the liquid crystal display panel. Accordingly, the liquid crystal display panels can be arranged in a mother substrate 100 without a space in between in the longitudinal direction. That is to say, in the mother substrate 100, no material is wasted, and the yield of the material can be made 100%. Accordingly, in some cases the number of liquid crystal display panels that can be formed in the mother substrate 100 is greater than in the prior art.

Furthermore, according to the present invention, the work of separating liquid crystal display panels from the mother substrate 100 in the longitudinal direction can be carried out in a single process for division. That is to say, there is no margin to be removed between liquid crystal display panels. Furthermore, the work of separation is carried out just once, meaning that the amount of glass fragments becomes half, and reduction in the yield in the process due to glass fragments can be prevented. Moreover, according to the present embodiment, the cutting line 40 does not cross over the sealing material 30 when liquid crystal display panels are separated, and therefore, no irregular cross section or burrs are created in end portions of the liquid crystal display panels. In addition, the yield in the process is not reduced due to glass fragments adhering in portions crossing over the sealing material 30.

Though the sealing material 30 is applied on the facing substrate 20 using a dispenser in the above description, the sealing material 30 may be applied on the TFT substrate 10.

As described above, according to the present invention, the cutting line 40 does not cross over the sealing material 30 when the liquid crystal display panel is cut from a mother substrate 100; neither in the case where the liquid crystal display panel is filled with liquid crystal in accordance with a suction method, nor when it is filled in accordance with a dropping method, and therefore, the entire end portion around the liquid crystal display panel has a regular cross section. In addition, the yield in subsequent steps can be prevented from lowering due to glass fragments adhering to the broken sealing material 30.

Furthermore, the yield of the material can be increased in the case where a number of liquid crystal display panels are formed from a mother substrate 100, and therefore, the number of liquid crystal display panels that can be formed per mother substrate 100 can be increased, and in addition, the amount of work of dividing liquid crystal display panels from a mother substrate 100 can be reduced by half, and therefore, glass fragments can be prevented from being created, and the yield in the process can be increased.

A drive circuit, a backlight and the like are combined with the thus formed liquid crystal display panel, so that a liquid crystal display device is provided. In addition, in reflective type liquid crystal display devices, no backlight is necessary, and thus, a liquid crystal display panel can be combined with a drive circuit in order to provide a liquid crystal display device. The above described liquid crystal display panel is not only for large-scale liquid crystal display devices, such as TV's, but also for small-scale liquid crystal display devices used for cellular phones.

The invention claimed is:

1. A liquid crystal display device having a liquid crystal display panel which comprises a TFT substrate, a facing substrate and a sealing member for pasting said facing substrate and said TFT substrate together, and is filled in with liquid crystal between said facing substrate and said TFT substrate, characterized in that said sealing member is formed in annular form along the end portion of said liquid crystal display panel and has end portions which are a starting point and a finishing point when said sealing member is formed, and said end portions of said sealing member are disposed at points on a display region side of said sealing member formed in annular form on said liquid crystal display panel.

2. The liquid crystal display device according to claim 1, characterized in that said TFT substrate has a side which does not overlap with said facing substrate and a display region side which overlaps with said facing substrate in the periphery of said TFT substrate, and said end portions of said sealing member are disposed at said points on said display region side which overlaps with said facing substrate.

3. The liquid crystal display device according to claim 1, characterized in that a black matrix is formed along said sealing member in such a manner as not to overlap with said sealing member.

4. A liquid crystal display device having a liquid crystal display panel which comprises a TFT substrate, a facing substrate and a sealing member for pasting said facing substrate and said TFT substrate together, and is filled in with liquid crystal between said facing substrate and said TFT substrate, characterized in that a black matrix in frame form is formed in a periphery of a display region of said facing substrate of said liquid crystal panel, said sealing member is formed in annular form in a periphery of said black matrix and has a suction hole for sucking in liquid crystal, and said sealing member has end portions which are a starting point and a finishing point when said sealing member is formed, and said end portions of said sealing member are formed on a display region side of said sealing member formed in annular form on said liquid crystal display panel outside of a border between said black matrix and said display region.

5. The liquid crystal display device according to claim 4, characterized in that said TFT substrate has a side which does not overlap with said facing substrate and a display region side which overlaps with said facing substrate in a periphery of said TFT substrate, and said end portions of said sealing member are disposed at points on said display region side which overlaps with said facing substrate.

6. The liquid crystal display device according to claim 4, characterized in that said sealing member is formed of an ultraviolet ray curing resin and said black matrix is not formed in portions where said sealing member is formed.

7. The liquid crystal display device according to claim 6, characterized in that a width of said black matrix in frame form in a direction perpendicular to sides of said facing substrate is smaller in said suction hole portion of said sealing member than in other portions.

8. A liquid crystal display device having a liquid crystal display panel which comprises a TFT substrate, a facing substrate and a sealing member for pasting said facing substrate and said TFT substrate together, and is filled in with liquid crystal between said facing substrate and said TFT substrate, characterized in that
  a black matrix in frame form is formed in a periphery of a display region of said facing substrate of said liquid crystal display panel,
  said sealing member has end portions which are a starting point and a finishing point when said sealing member is formed in said suction hole in such a manner that said end portions of said sealing member overlap, and
  said end portions of said sealing member are disposed at points on a display region side of said sealing member formed in annular form on said liquid crystal display panel outside of a border between said black matrix and said display region.

9. The liquid crystal display device according to claim 8, characterized in that
  said TFT substrate has a side which does not overlap with said facing substrate and a display region side which overlaps with said facing substrate in a periphery of said TFT substrate, and
  said end portions of said sealing member are disposed at said points on said display region side which overlaps with said facing substrate.

10. The liquid crystal display device according to claim 8, characterized in that said sealing member is formed of an ultraviolet ray curing resin and said black matrix is not formed in portions where said sealing member is formed.

11. The liquid crystal display device according to claim 10, characterized in that a width of said black matrix in frame form in a direction perpendicular to sides of said facing substrate is smaller at a point where said end portions of said sealing member are than in other portions.

12. The liquid crystal display device according to claim 1, characterized in that said end portions of said sealing member are formed to extend toward an interior of a display region of said liquid crystal panel within said annular form of said sealing member.

13. The liquid crystal display device according to claim 4, characterized in that said end portions of said sealing member are formed to extend toward an interior of a display region of said liquid crystal panel within said annular form of said sealing member.

14. The liquid crystal display device according to claim 8, characterized in that said end portions of said sealing member are formed to extend toward an interior of a display region of said liquid crystal panel within said annular form of said sealing member.

* * * * *